US010825456B2

(12) United States Patent
Won

(10) Patent No.: US 10,825,456 B2
(45) Date of Patent: Nov. 3, 2020

(54) METHOD AND APPARATUS FOR PERFORMING PRESET OPERATION MODE USING VOICE RECOGNITION

(71) Applicant: Samsung Electronics Co., Ltd., Gyeonggi-do (KR)

(72) Inventor: Sung-Joon Won, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/247,987

(22) Filed: Jan. 15, 2019

(65) Prior Publication Data
US 2019/0147879 A1    May 16, 2019

Related U.S. Application Data

(63) Continuation of application No. 13/954,432, filed on Jul. 30, 2013, now abandoned.

(30) Foreign Application Priority Data

Oct. 8, 2012  (KR) .................. 10-2012-0111402

(51) Int. Cl.
*G10L 15/22*       (2006.01)
*G10L 15/26*       (2006.01)
*G06F 3/16*        (2006.01)

(52) U.S. Cl.
CPC .............. *G10L 15/22* (2013.01); *G06F 3/167* (2013.01); *G10L 15/26* (2013.01); *G10L 2015/221* (2013.01); *G10L 2015/223* (2013.01)

(58) Field of Classification Search
CPC .................................................... G10L 15/02
(Continued)

(56) References Cited

U.S. PATENT DOCUMENTS 6,545,669 B1    4/2003  Kinawi et al.
6,725,194 B1 *  4/2004  Bartosik ............... G10L 15/075
                                                       704/235
(Continued)

FOREIGN PATENT DOCUMENTS

CN    1602461        3/2005
EP    1 365 349      11/2003
(Continued)

OTHER PUBLICATIONS

Chinese Office Action dated May 22, 2017 issued in counterpart application No. 201310463866.1, 32 pages.
(Continued)

*Primary Examiner* — Huyen X Vo
*Assistant Examiner* — Timothy Nguyen
(74) *Attorney, Agent, or Firm* — The Farrell Law Firm, P.C.

(57) ABSTRACT

A method and apparatus are provided for assisting a text writing operation by using voice recognition. The method includes displaying an input text according to a key input or a touch input in a text writing mode on a text display window; recognizing a voice input while displaying the input text according to the key input or the touch input on the text display window; and assisting a preset text writing operation according to the recognized voice input while displaying the input text according to the key input or the touch input on the text display window. Assisting the preset text writing operation comprises, in response to a first part of the recognized voice input matching a pre-stored command, displaying a result obtained based on a second part of the recognized voice input, together with the input text according to the key input or the touch input, on the text display window.

8 Claims, 14 Drawing Sheets

(58) Field of Classification Search
USPC .......................................................... 704/250
See application file for complete search history.

(56) References Cited

U.S. PATENT DOCUMENTS

| | | | |
|---|---|---|---|
| 7,380,203 B2* | 5/2008 | Keely .................... | G06K 9/222 704/235 |
| 7,877,700 B2 | 1/2011 | Carr et al. | |
| 10,241,668 B2 | 3/2019 | Sharifi et al. | |
| 2003/0061053 A1 | 3/2003 | Payne et al. | |
| 2003/0117365 A1* | 6/2003 | Shteyn .................. | G06F 3/0481 345/156 |
| 2003/0157968 A1* | 8/2003 | Boman ............. | H04M 1/72547 455/563 |
| 2003/0216913 A1 | 11/2003 | Keely et al. | |
| 2005/0131687 A1 | 6/2005 | Sorrentino | |
| 2005/0159948 A1* | 7/2005 | Roth ....................... | G10L 15/22 704/233 |
| 2006/0106614 A1* | 5/2006 | Mowatt ................... | G06F 3/167 704/275 |
| 2007/0100635 A1* | 5/2007 | Mahajan ................. | G10L 15/22 704/276 |
| 2008/0228496 A1* | 9/2008 | Yu ........................... | G06F 3/038 704/275 |
| 2009/0055181 A1 | 2/2009 | Han et al. | |
| 2009/0214117 A1* | 8/2009 | Ma ..................... | G06K 9/00409 382/187 |
| 2009/0253463 A1* | 10/2009 | Shin .................. | H04M 1/72583 455/563 |
| 2009/0306980 A1 | 12/2009 | Shin | |
| 2009/0326938 A1* | 12/2009 | Marila .................... | G10L 15/22 704/235 |
| 2010/0009720 A1* | 1/2010 | Cha ........................ | G06F 1/1624 455/566 |
| 2010/0295789 A1 | 11/2010 | Shin et al. | |
| 2011/0115702 A1* | 5/2011 | Seaberg .................. | G06F 3/017 345/156 |
| 2012/0035931 A1 | 2/2012 | LeBeau et al. | |
| 2012/0064947 A1 | 3/2012 | Yi et al. | |
| 2012/0075184 A1* | 3/2012 | Madhvanath ........... | G10L 15/22 345/161 |
| 2013/0035941 A1* | 2/2013 | Kim ........................ | G06F 3/017 704/275 |
| 2015/0206532 A1* | 7/2015 | Fujisawa ................. | G10L 15/22 704/251 |

FOREIGN PATENT DOCUMENTS

| | | |
|---|---|---|
| EP | 1 619 661 | 1/2006 |
| EP | 2 397 936 | 12/2011 |
| JP | 2003-195939 | 7/2003 |
| JP | 2006-515073 | 5/2006 |
| KR | 10-2004-0063170 | 7/2004 |
| KR | 10-2006-0037228 | 5/2006 |
| KR | 1020080063471 | 7/2008 |
| KR | 10-2009-0020265 | 2/2009 |
| KR | 10-2009-0130350 | 12/2009 |
| KR | 1020100006089 | 1/2010 |
| KR | 10-2010-0064875 | 6/2010 |
| KR | 1020120026395 | 3/2012 |
| WO | WO 00/04706 | 1/2000 |
| WO | WO 03/050668 | 6/2003 |
| WO | WO 2007/114833 | 10/2007 |
| WO | WO 2008/064137 | 5/2008 |

OTHER PUBLICATIONS

Korean Office Action dated Jul. 17, 2018 issued in counterpart application No. 10-2012-0111402, 9 pages.
Japanese Office Action dated Sep. 26, 2017 issued in counterpart application No. 2013-210818, 8 pages.
European Search Report dated Sep. 28, 2015 issued in counterpart application No. 13187798.7-1910, 6 pages.
KR Decision of Grant dated Jun. 26, 2019 issued in counterpart application No. 10-2012-0111402, 6 pages.
Indian Examination Report dated Jan. 21, 2020 issued in counterpart application No. 1148/KOL/2013, 5 pages.

* cited by examiner

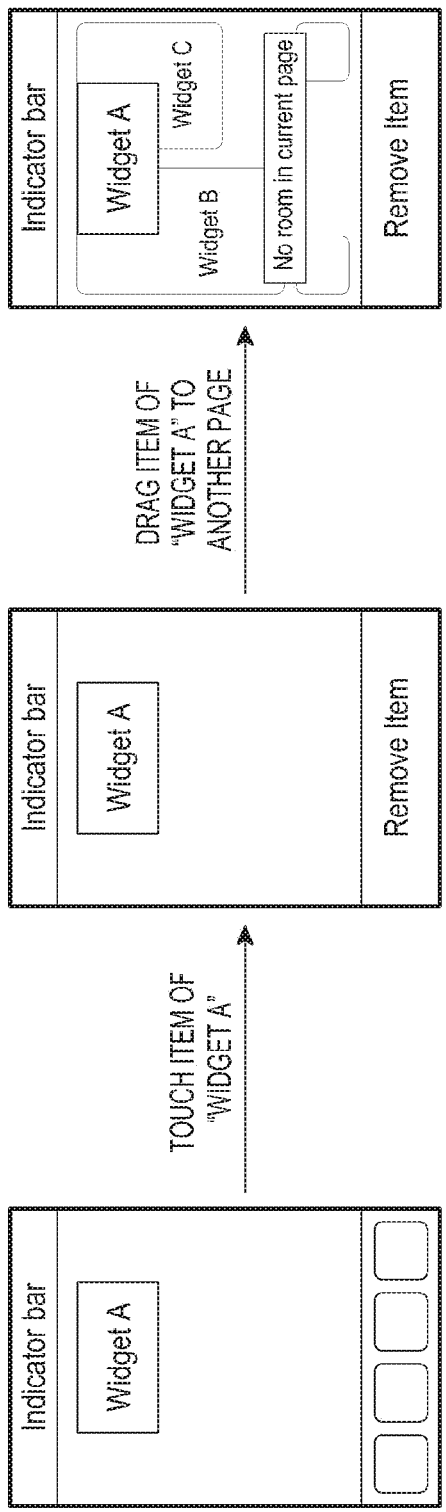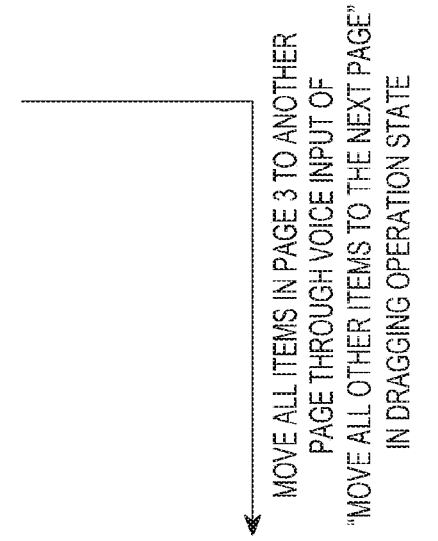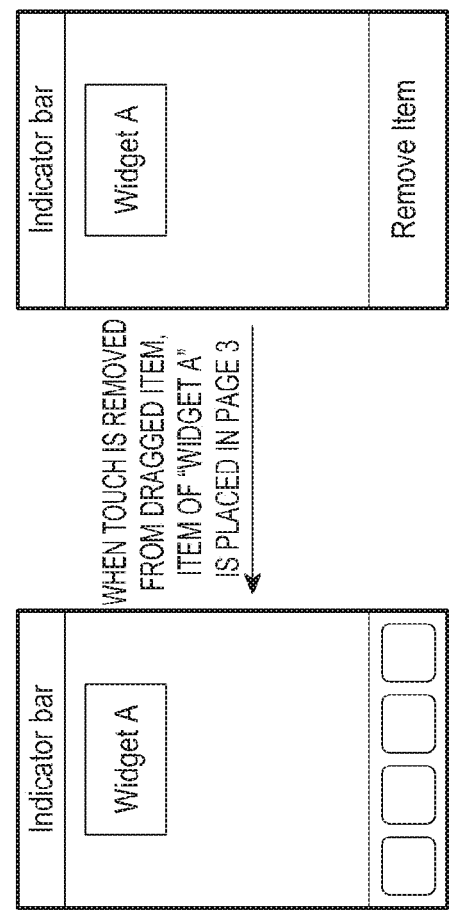

METHOD AND APPARATUS FOR PERFORMING PRESET OPERATION MODE USING VOICE RECOGNITION

PRIORITY

This application is a Continuation of U.S. application Ser. No. 13/954,432, which was filed in the U.S. Patent and Trademark Office on Jul. 30, 2013, and claims priority under 35 U.S.C. § 119(a) to Korean Application Serial No. 10-2012-0111402, which was filed in the Korean Intellectual Property Office on Oct. 8, 2012, the entire content of each of which is hereby incorporated by reference.

BACKGROUND OF THE INVENTION

1. Field of the Invention

The present invention relates generally to voice recognition technology used for a terminal, and more particularly, to a method and an apparatus for performing a preset operation mode using voice recognition which recognizes an input voice command to perform a preset operation mode of a terminal.

2. Description of the Related Art

Recently, functions of terminals have become diversified, and thus terminals are implemented as multimedia devices having complex functions such as photographing pictures or videos, reproducing music or video files, playing games, receiving broadcasting, and executing applications. Further, terminals such as smart phones and tablet PCs are provided with touch screens to execute various functions of the terminals by inputting text through a touch input, scrolling, and dragging.

In executing various functions of the terminal, users prefer a simple control, and thus various attempts in hardware or software have currently been made to implement the terminal in consideration of preferences of the users.

One of these various attempts assists execution of the functions of the terminal by applying voice recognition technologies to the terminal, and the voice recognition terminal is actively being researched and under development.

Korean Patent Publication No. 10-2009-0020265 discloses a function of modifying a message to which a voice signal is applied, such as inputting, moving, deleting, modifying, and searching for a message through voice recognition. Further, Korean Patent Publication No. 10-2010-0064875 discloses a function of converting a user's voice to a text through voice recognition and then displaying the text, and a function of executing a text modifying operation by selecting a user's voice, a touch, or a key input from displayed command lists through a touch of a part to be modified.

In the prior art, voice recognition through which operations are performed is utilized. Advanced voice recognition technologies are still being researched, but there is still no perfect voice recognition technology which can precisely recognize a voice. Accordingly, when a preset main operation is executed by applying voice recognition, the operation is occasionally not performed due to an incorrectly recognized voice, and users are inconvenienced by these errors. That is, when an error is generated in the voice recognition corresponding to the main operation, many more control steps may be required, and accordingly, it takes a lot of time to correctly perform the operation. Therefore, when the main operation is to be executed by applying the voice recognition technology, it may be somewhat difficult to conveniently and widely apply voice recognition.

SUMMARY OF THE INVENTION

The present invention has been made to address at least the problems and/or disadvantages described above, and to provide at least the advantages described below.

Accordingly, an aspect of the present invention is to provide a method and an apparatus for performing a preset operation mode by using voice recognition, which can reduce inconvenience due to an error of the voice recognition which can be generated when a main action is to be executed by applying the voice recognition.

In accordance with an aspect of the present invention, a method is provided for using voice recognition. The method includes displaying an input text according to a key input or a touch input in a text writing mode on a text display window; recognizing a voice input while displaying the input text according to the key input or the touch input on the text display window; and assisting a preset text writing operation according to the recognized voice input while displaying the input text according to the key input or the touch input on the text display window. Assisting the preset text writing operation comprises in response to a first part of the recognized voice input matching a pre-stored command, displaying a result obtained based on a second part of the recognized voice input, together with the input text according to the key input or the touch input, on the text display window.

In accordance with another aspect of the present invention, an apparatus is provided for assisting a text writing operation by using voice recognition. The apparatus includes an input/output module including at least one button and a physical or virtual keypad configured to receive a control input of a user, and a microphone receiving a voice input from the user; a touch screen configured to receive a control input of the user and display an execution image, an operation state, and a menu state of an application program; and a controller including a voice recognition module, the controller configured to control the input/output module and the touch screen, display a text received from the input/output module on a text display window of the touch screen, recognize a voice input by the user through the microphone of the input/output module while displaying the text received from the input/output module on the text display window, and assist a preset text writing operation according to the recognized voice input while displaying the text received from the input/output module on the text display window, by displaying, in response to a first part of the recognized voice input matching a pre-stored command, a result obtained based on a second part of the recognized voice input, together with the text received from the input/output module, on the text display window.

BRIEF DESCRIPTION OF THE DRAWINGS

The above and other aspects, features, and advantages of the present invention will be more apparent from the following detailed description taken in conjunction with the accompanying drawings, in which:

FIGS. 14A to 14E illustrate an example of assisting a home screen editing by using voice recognition according to the seventh embodiment of the present invention.

DETAILED DESCRIPTION OF EMBODIMENTS OF THE PRESENT INVENTION

Hereinafter, various embodiments of the present invention will be described with reference to the accompanying drawings. In the following description, specific embodiments are provided and described, but they are provided merely to help with a general understanding of the present invention. Therefore, it will be apparent to those skilled in the art that the specific embodiments can be changed or modified without departing from the scope of the present invention.

Figure 1:
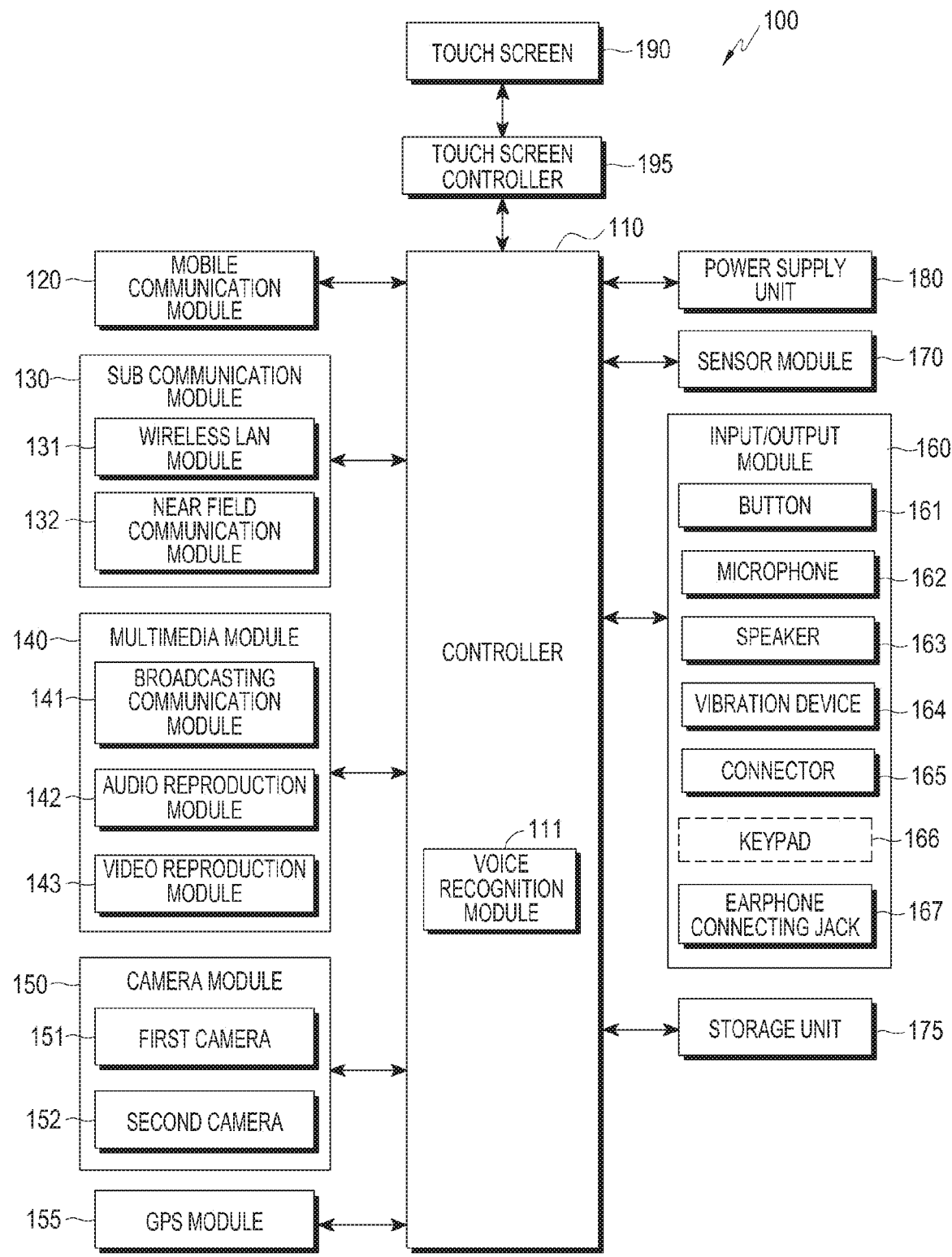
FIG. 1 is a block diagram of a mobile device according to the present invention.

FIG. 1 a block diagram of a mobile device according to an embodiment of the present invention.

Referring to FIG. 1, a device 100 includes a display unit 190 and a display controller 195. Further, the device 100 may include a controller 110, a mobile communication module 120, a sub communication module 130, a multimedia module 140, a camera module 150, a GPS module 155, an input/output module 160, a sensor module 170, a storage unit 175, and power supplier 180. The sub communication module 130 includes at least one of a wireless LAN module 131 and a Near Field Communication (NFC) module 132, and the multimedia module 140 includes at least one of a broadcasting communication module 141, an audio reproduction module 142, and video reproduction module 143. The camera module 150 includes at least one of a first camera 151 and a second camera 152. Hereinafter, a case where the display unit 190 and the display controller 195 are a touch screen and a touch screen controller, respectively, will be described as an example.

The controller 110 controls the mobile communication module 120, the sub communication module 130, the multimedia module 140, the camera module 150, the GPS module 155, the input/output module 160, the sensor module 170, the storage unit 175, the power supplier 180, the touch screen 190, and the touch screen controller 195. Further, the controller 110 includes a voice recognition module 111 which recognizes a voice input from a microphone 162 of the input/output module 160. In addition, the controller 110 receives a control of the user from the input/output module 160 or the touch screen 190 to perform a preset operation, and assists performance of the preset operation by receiving a voice of the user from the voice recognition module 111 and applying the recognized voice. The control of the user from the input/output module 160 can be received by the controller 110 through keypad 166.

The mobile communication module 120 connects the mobile communication device 100 with an external device by using one or a plurality of antennas (not shown) according to a control of the controller 110. The mobile communication module 120 transmits/receives a radio signal for voice call, a video call, a Short Message Service (SMS), or a Multimedia Message Service (MMS) with a mobile phone (not shown), a smart phone (not shown), a tablet PC, or another device (not shown) which has a phone number input to the device 100.

The wireless LAN module 131 of the sub communication module 130 can be Internet-connected according to a control of the controller 110 in a place where a wireless Access Point (AP) (not shown) is installed. The wireless LAN module 131 supports a wireless LAN standard (IEEE802.11x) of the Institute of Electrical and Electronics Engineers. The NFC module 132 can wirelessly perform near field communication between the portable terminal 100 and an image forming apparatus (not shown) according to a control of the controller 110.

The device 100 includes at least one of the mobile communication module 120, the wireless LAN module 131, and the NFC module 132. For example, the device 100 includes a combination of the mobile communication module 120, the wireless LAN module 131, and the NFC module 132 according to the capability.

The multimedia module 140 includes the audio reproduction module 142 and the video reproduction module 143, and may or may not include the broadcasting communication module 141. Further, the audio reproduction module 142 or the video reproduction module 143 of the multimedia module 140 may be included in the controller 110.

The input/output module 160 includes a plurality of buttons 161, a microphone 162, and a keypad 166. The button 161 may be formed on a housing of the mobile device 100. The microphone 162 receives a voice or a sound to generate an electrical signal according to a control of the controller 110.

The keypad 166 receives a key input from the user for the control of the device 100. The keypad 166 includes a physical keypad (not shown) formed in the device 100 or a virtual keypad (not shown) displayed on the display unit 190. The physical keypad (not shown) formed in the device 100 may be excluded according to capability or a structure of the device 100.

The storage unit 175 can store a signal or data input/output according to operations of the mobile communication module 120, the sub communication module 130, the multimedia module 140, the camera module 150, the GPS module 155, the input/output module 160, the sensor module 170, and the display unit 190. The storage unit 175 can store a control program and applications for controlling the device 100 or the controller 110.

The term "storage unit" includes the storage unit 175, a ROM 112 and a RAM 113 within the controller 110, or a memory card (not shown) (for example, an SD card and a memory stick) installed in the device 100. The storage unit may include a nonvolatile memory, a volatile memory, a Hard Disk Drive (HDD), or a Solid State Drive (SSD).

The touch screen 190 receives a control of the user and displays an execution image, an operation state, and a menu state of an application program.

The touch screen 190 provides the user with a user interface corresponding to various services (for example, phone communication, data transmission, broadcasting, taking a picture, etc.). The touch screen 190 transmits an analog signal corresponding to at least one touch input to the user interface to the touch screen controller 195. The touch screen 190 receives at least one touch through a body part of the user (for example, fingers including a thumb) or a touchable input device. Further, the touch screen 190 receives successive actions of one touch among at least one touch. The touch screen 190 transmits the analog signal corresponding to successive actions of the input touch to the touch screen controller 195.

The touch screen 190 may be implemented, for example, in a resistive type, a capacitive type, an infrared type, or an acoustic wave type.

The touch screen controller 195 converts the analog signal received from the touch screen 190 to a digital signal (for example, X and Y coordinates) and then transmits the digital signal to the controller 110. The controller 110 controls the touch screen 190 by using the digital signal received from the touch screen controller 195. For example, the controller 110 can enable a shortcut icon (not shown) displayed on the touch screen 190 to be selected or executed in response to the touch. Further, the touch screen controller 195 may be included in the controller 110.

The touch screen 190 may include at least two touch screen panels which detect a touch or an approach of a user's body part or a touchable input device in order to simultaneously receive inputs of the user's body part and the touchable input device. The at least two touch screen panels provide different output values to the touch screen controller 195, and the touch screen controller 195 differently recognizes the values input from the at least two touch screen panels to determine whether the input from the touch screen is an input by the user's body part or an input by the touchable input device.

A method of performing a preset operation in a preset operation mode by using voice recognition according to the present invention may be divided into two processes as described below. The first process is a process of performing a main operation in which a preset operation of an operation mode is performed according to a key input or a touch input in a preset operation mode. The second process is a process of assisting the main operation in which a voice input during an execution of the preset operation of the operation mode in the first process is recognized and then the operation of the first process is assisted according to the recognized voice.

Figure 2:
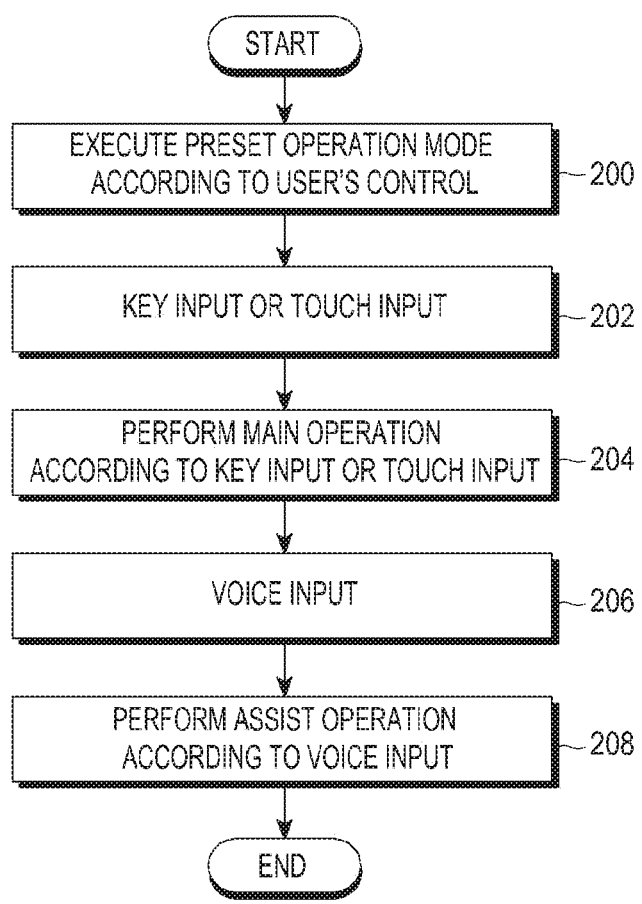
FIG. 2 is a flowchart illustrating a process of applying performance of a preset operation mode by using voice recognition according to an embodiment of the present invention.

FIG. 2 is a flowchart illustrating a process of performing a preset operation in a preset operation mode by using voice recognition according to a characteristic of the present invention.

Referring to FIG. 2, a preset operation is selected from a plurality of preset operation modes of the device 100 through a user's control input using one of the button 161, the keypad 166, and the microphone 162 of the input/output module 160, or the touch screen 190, and then the selected preset operation mode is executed in step 200. After the execution of the preset operation mode of the device 100, at step 202 a key input or touch input by the user for executing the preset operation of the preset operation mode is performed. In step 204, a preset operation according to the touch input in step 202 is performed.

In step 206, a voice is received from the user through the microphone 162 while the preset operation is executed. Thereafter, in step 208, an operation of recognizing the received voice by applying voice recognition of the voice recognition module 111, and assisting performance of the preset operation is performed using the recognized voice.

At this time, the preset operation mode includes various operation modes executed by a user's control input, such as, for example, a text writing mode, a list menu execution mode, and a home screen execution mode. Further, the preset operation includes a text input, a touch input, and scrolling and dragging applying the touch input.

The term "touch" means an operation in which the user contacts a particular area of the touch screen by using a body part or a touchable input device and then removing the body part or touchable input device which contacts the particular area, or a flick action in which the user contacts a particular area of the touch screen by using a body part or a touchable input device and then removes the body part or touchable input device in a movement direction on the terminal.

The method of performing the preset operation by using voice recognition according to the present invention will be described below in more detail, through embodiments described below.

Figure 3:
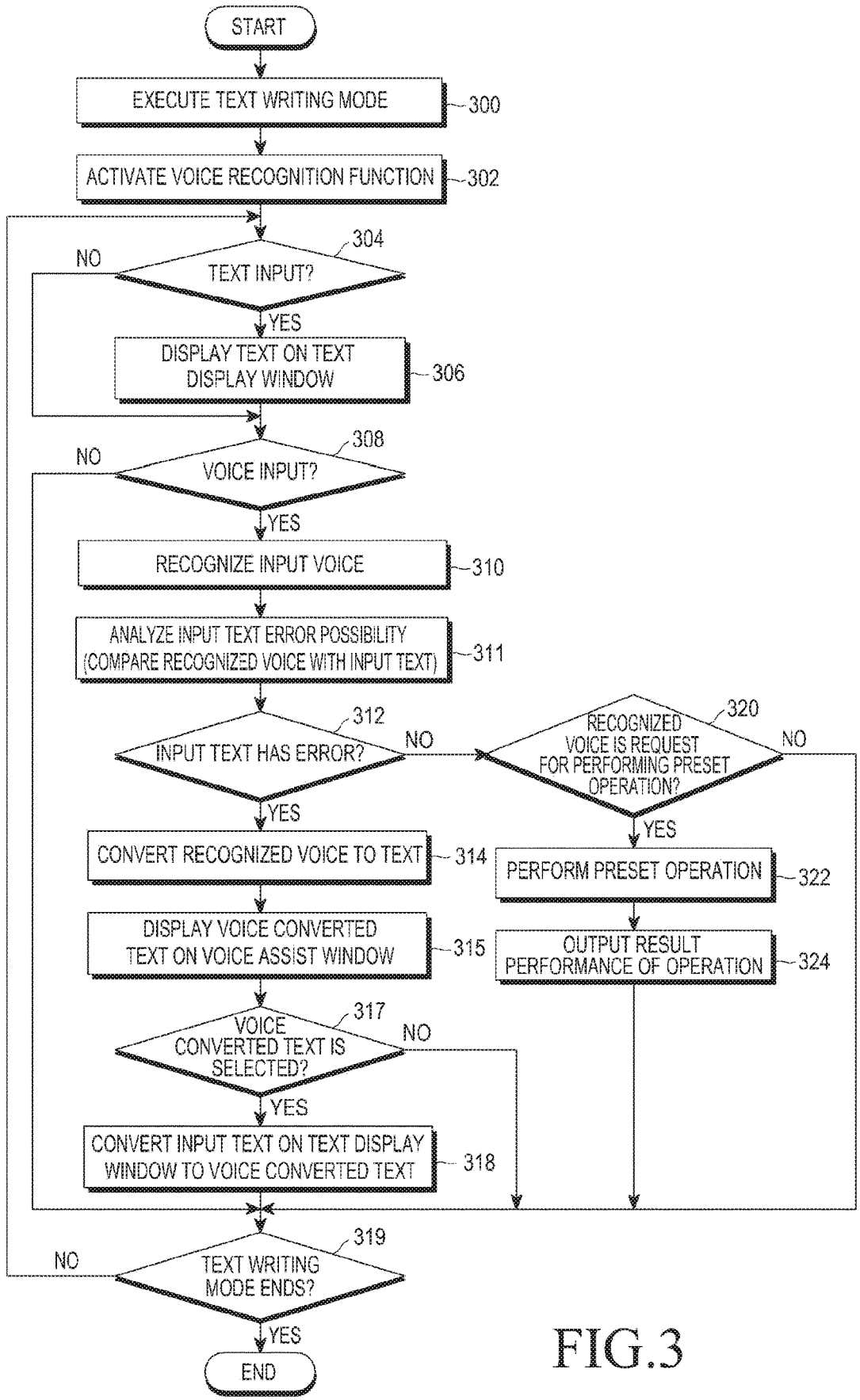
FIG. 3 is a flowchart illustrating a process of modifying a text and assisting a preset operation by using voice recognition according to a first embodiment of the present invention.

The method of performing the preset operation by using the voice recognition according to the present invention in a text writing mode, which is one of the preset operation modes, will be described. FIG. 3 is a flowchart illustrating a process of modifying a text and assisting a preset operation by using voice recognition according to the first embodiment of the present invention. An operation of simultaneously inputting a text and a voice in the text writing mode and assisting a modification of the input text by using the input voice will be described.

Referring to FIG. 3, steps 300 to 306 are steps for performing the preset operation according to a key input or a touch input in the preset operation mode in the first process of FIG. 2 in which a main operation of executing the text writing mode and displaying the input text on a preset text display window is described.

Figure 4:
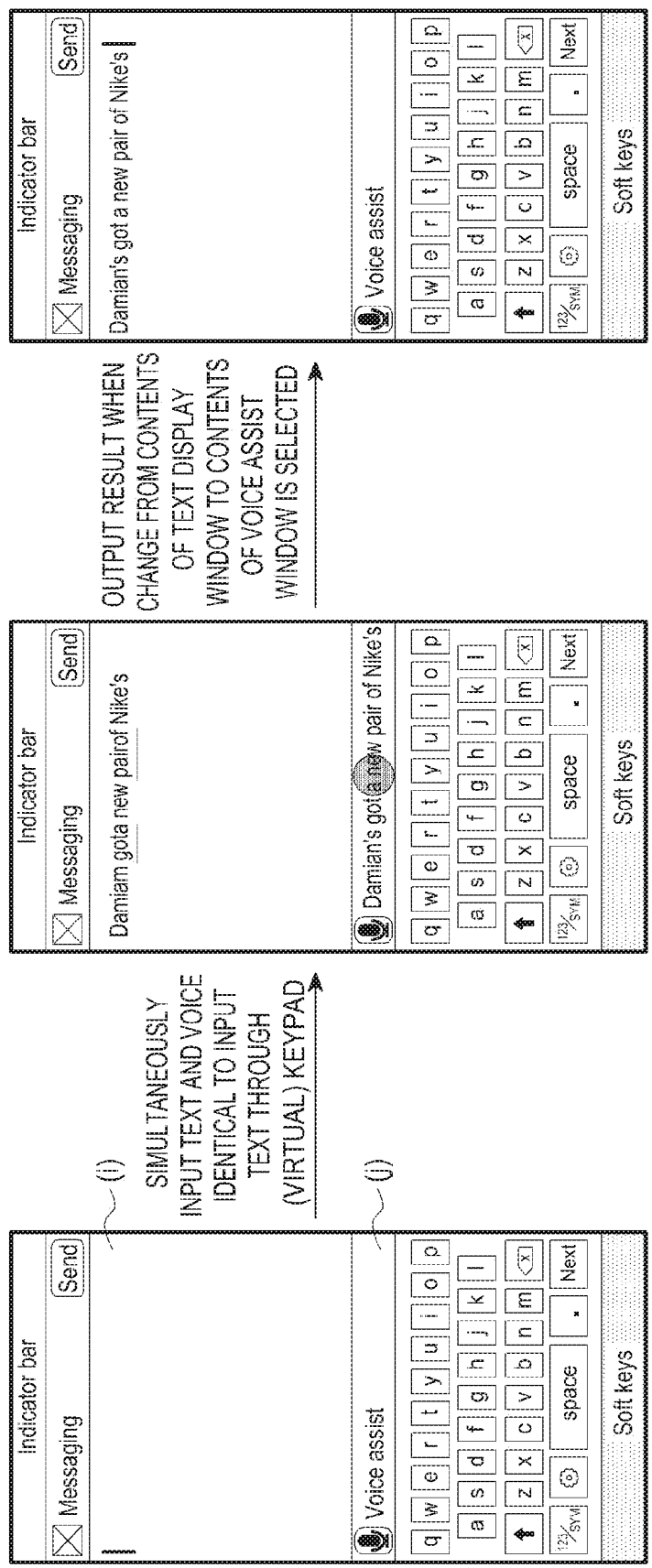
FIGS. 4A to 4C illustrate an example of assisting a text modification by using voice recognition according to the first embodiment of the present invention.

First, the text writing mode is executed through a user's control input in step 300, and a voice recognition function of the voice recognition module 111 is activated in step 302. At this time, the voice recognition function of the voice recognition module 111 may be automatically activated simultaneously with the execution of the text writing mode or may be activated by a user's selection. Thereafter, it is determined whether the text is input through the physical or virtual keypad 166 according to a key input or a touch input in step 304. When the text is input in step 306, the input text is displayed on a preset text display window (i), as seen in FIG. 4A. If not, the whether there is a voice input is checked in step 308.

The remaining steps correspond to the second process of FIG. 2 of recognizing the voice input during the execution of the preset operation of the preset operation mode of the first process of FIG. 2 to assist performance of the operation of the first process according to the recognized voice.

In step 308, it is determined whether a voice is input through the microphone 162. The voice can be input in all cases, such as where the text is not input, the text is being input, or the text is input and then displayed in the text writing mode. Hereinafter, in all these cases, where the text is not input, the text is being input, or the text is input and then displayed in the text writing mode, the process will be described with reference to the case where the text is being input. When a voice is input from the user while the text is being input in the text writing mode, the activated voice recognition module 111 recognizes the input voice in step 310. If no voice is input, a determination is made by the user as to whether the text writing mode should end at step 319.

Steps 311 to 318 describe the operation of assisting the modification of the text. That is, in step 311 the displayed text is compared with the recognized voice, as the user reads the displayed text aloud, which is input through the microphone 162. When the displayed text is not identical to the recognized voice, it is determined in step 312 that the displayed text has an error. When the displayed text has an error, the recognized voice is converted to a text to assist in the modification of the displayed text, in step 314. When the displayed text is identical to the recognized voice, it is determined that the displayed text has no error in step 312.

As a result of the determination whether the input text has an error in step 312, when the displayed text has an error, the recognized voice is converted to the text in step 314, and the voice converted text is displayed as seen in FIG. 4A on a preset voice assist window (j), in step 315. The voice assist window (j) is set to be distinguished from the text display window (i), and is located and displayed adjacent to the text display window (i) at an upper, lower, left or right side.

Thereafter, the user identifies contents of the text display window (i) and contents of the voice assist window (j) and determines in step 317 whether to change the contents of the text display window (i) into the contents of the voice assist window (j). When the user desires to change the contents of the text display window (i) to the contents of the voice assist window (j), the user converts the text displayed on the text display window (i) into the voice converted text displayed on the voice assist window (j) by applying a preset function to change the contents of the text display window (i) to the contents of the voice assist window (j) through a user's control in step 318. The preset function for changing the contents of the text display window (i) to the contents of the voice assist window (j) may be set as an item in the text writing mode, a popup window on the touch screen 190, or an input of a preset voice command using microphone 162. If the function is set as an item in the text writing mode or as a popup window, the user inputs the command using button 161 of keypad 166.

The user then selects whether to end the text writing mode in step 319. When the user does not desire to end the text writing mode, the text writing mode does not end and the process returns to step 304. When the user selects to end the text writing mode, the text writing mode ends.

In step 312, if the input text is identical to the recognized voice, that is, there is no error, steps 320 to 324 are performed, which describe performance of a preset operation command. That is, as a result of the determination where the input text has the error in step 312, when the displayed text has no error and a recognized voice is a preset operation command, steps 320 to 324 describe the performance of the preset operation command by applying the recognized voice.

When the displayed text has no error in step 312, it is determined whether the recognized voice is the preset operation command in step 320. When the recognized voice is the preset operation command, the preset operation command is performed by applying the recognized voice in step 322. When the preset operation command is completely performed, a result of the operation is output in step 324. At this time, performance of the operation command should not interrupt further inputting of the text and displaying the input text. That is, the text input can be performed simultaneously with the voice input and recognition of the input voice. Further, when the text is input while the preset operation command of the input and recognized voice is performed, the text can be displayed. In addition, in step 320, when the recognized voice has no similarity to the displayed text, the preset operation command is not applied when the voice recognition is applied.

After step 324, the user selects whether to end the text writing mode in step 319. The user also selects whether to end the text writing mode in step 319 if the recognized voice has no similarity to the displayed text in step 320. When the user does not desire to end the text writing mode, the text writing mode does not end and the process returns to step 304. When the user selects to end the text writing mode, the text writing mode ends.

FIGS. 4A to 4C illustrate an example of assisting the text writing for modification of the text by using voice recognition according to the first embodiment of the present invention.

Under an assumption that the user desires to input a text of "Damian's got a new pair of Nikes", the text writing mode is first executed through a user's control. FIG. 4A illustrates an image in the terminal including the text display window (i) and the voice assist window (j). The text display window (i) displays the input text and a result of performing the text writing operation. Further, the voice assist window (j) converts the input voice to the text and displays the converted text, and displays the status of the operation.

After the execution of the text writing mode, the text is input through the physical or virtual keypad 166. Simultaneously with or after the text input, a voice having the same contents as the text is input through the microphone 162 by the user reading the text aloud. In FIG. 4B, the input text is displayed on the text display window (i), and the input voice is converted to text and displayed on the voice assist window (j). The text displayed on the voice assist window (j) corresponds to an image generated by recognizing the input voice through the voice recognition, converting the voice to text, and then displaying the text on the voice assist window (j). The text input while the voice is input by the user may be preset to be highlighted or the input text may be preset to be distinguished from the voice of the user through an underline or highlight.

Thereafter, when the user desires to change the contents of the text display window (i) to the contents of the voice assist window (j), the user can change the text displayed on the text display window (i) to the voice converted text displayed on the voice assist window (j) by applying the preset function through a user's selection. The preset function may be a preset item that allows the user to select an application which changes the contents of the text display window (i) to the contents of the voice assist window (j), the preset function may be set to be displayed on the touch screen 190 as a popup window, or the preset function may be a preset voice command. FIG. 4C illustrates an image generated by changing the contents of the text display window (i) to the contents of the voice assist window (j).

Figure 5:
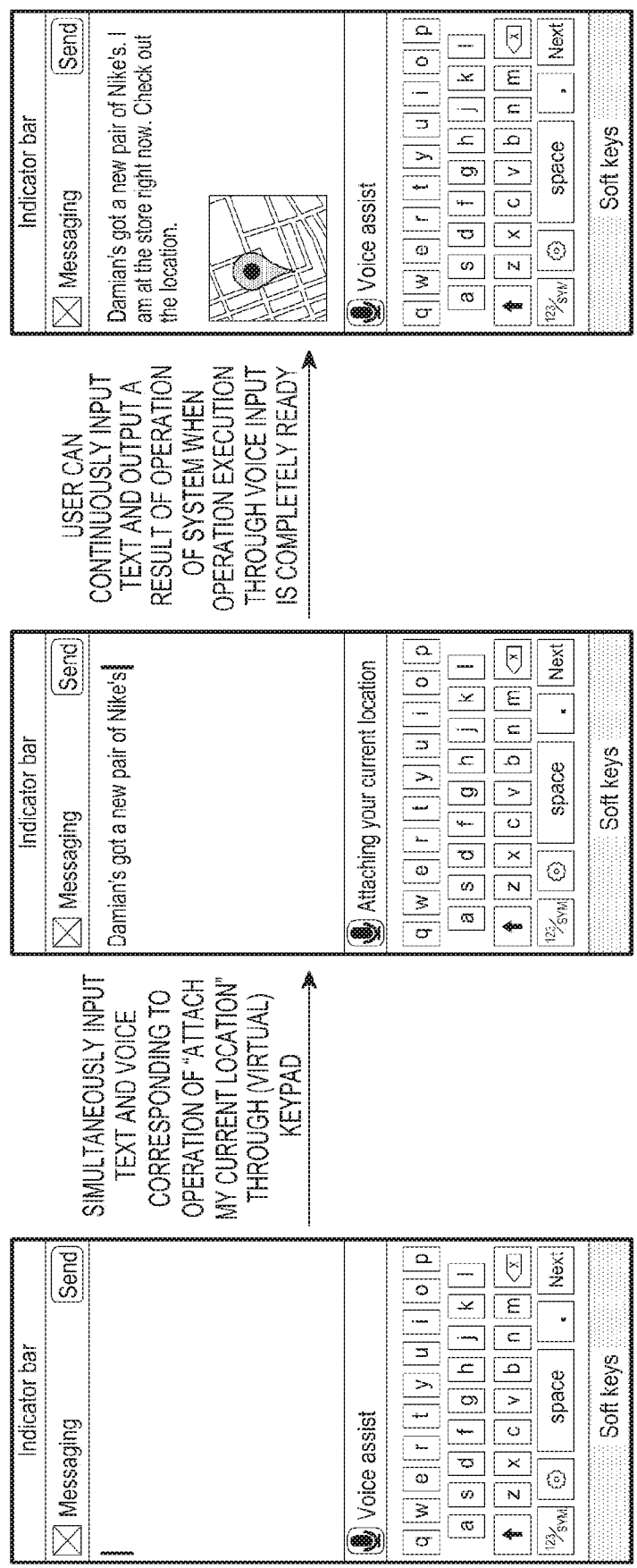
FIGS. 5A to 5C illustrate an example of assisting a preset operation by using voice recognition according to a second embodiment of the present invention.

FIGS. 5A to 5C illustrate an example of assisting a preset operation using voice recognition according to a second embodiment of the present invention. An operation of assisting performance of the preset operation during a text input by using the voice recognition will be described in detail with reference to FIG. 5.

Under an assumption that the user desires to identify his/her current position while inputting a text, the user first selects and executes the text writing mode through a user's control. FIG. 5A illustrates an image on the terminal including the text display window (i) and the voice assist window (j), prior to the input of the voice.

After the execution of the text writing mode, a text is input to the terminal through the physical or virtual keypad 166. Simultaneously with the text input, the user inputs a voice command of "Attach my current location" which is a preset operation command input through the microphone 162. As shown in FIG. 5B, an image generated by displaying an input text of "Damian's got a new pair of Nike's" on the text display window (i) and a text of "Attaching your current location" which expresses the performance of an operation command by recognizing an input voice on the voice assist window (j) is shown.

At this time, the user can continuously input the text. When an execution of the preset operation command through the voice input is completed, a user's position is output through a position related application stored in the terminal or an execution of a navigation application showing the user's position as a result of the operation of the system. The user's position can be determined by the GPS module 155 of FIG. 1. FIG. 5C illustrates an example of a displayed result image generated by executing a map showing a user's position which is an output result of the input text displayed on the text display window (i) after the preset operation command is completely executed.

Figure 6:
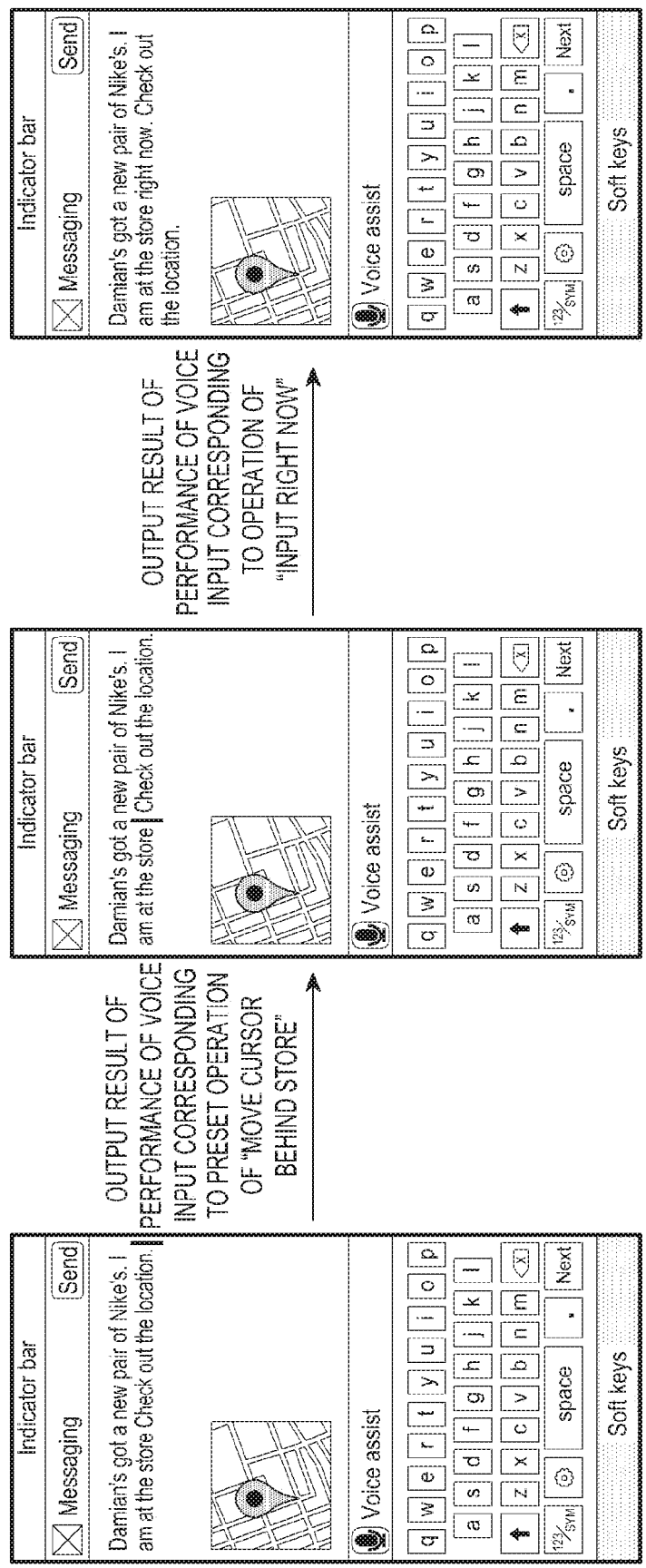
FIGS. 6A to 6C illustrate an example of assisting a preset operation by using voice recognition according a third embodiment of the present invention.

FIGS. 6A to 6C illustrate an example of assisting a preset operation by using voice recognition according to a third embodiment of the present invention. An operation of assisting the preset operation by using the voice recognition while the text is input will be described in detail with reference to FIG. 6.

FIG. 6A illustrates an example of a displayed result image generated by executing a map showing a user's position which is an output result as shown in FIG. 5C. First, the user inputs a voice command through the microphone 162 corresponding to a preset operation command of "Move a cursor behind 'store'" as shown in FIG. 6A. The command is for moving the cursor in the text to a position following the word "store" in the text shown in the text display window (i).

Thereafter, the input voice is recognized using voice recognition, and the operation command is performed according to the recognized voice of "Move a cursor behind 'store'".

FIG. 6B illustrates an image generated by moving the position of a cursor according to the operation command of the recognized voice of "Move a cursor behind 'store'".

Next, the user inputs a voice command of "Input 'right now'" corresponding to a preset operation command, the input voice is recognized using voice recognition, and the operation command is performed according to the recognized voice. FIG. 6C illustrates an image showing a result generated by inputting the text "right now" in a position where the cursor is located according to the recognized operation command of "Input 'right now'".

In addition, the preset operation command in the text writing mode may be set to operate functions preset to the terminal by the input voice, such as reproduction of music or a video, searching the Internet, and an execution of a particular application. Further, a result of the operation may be directly displayed on the text window or may appear as a popup window.

Figure 7:
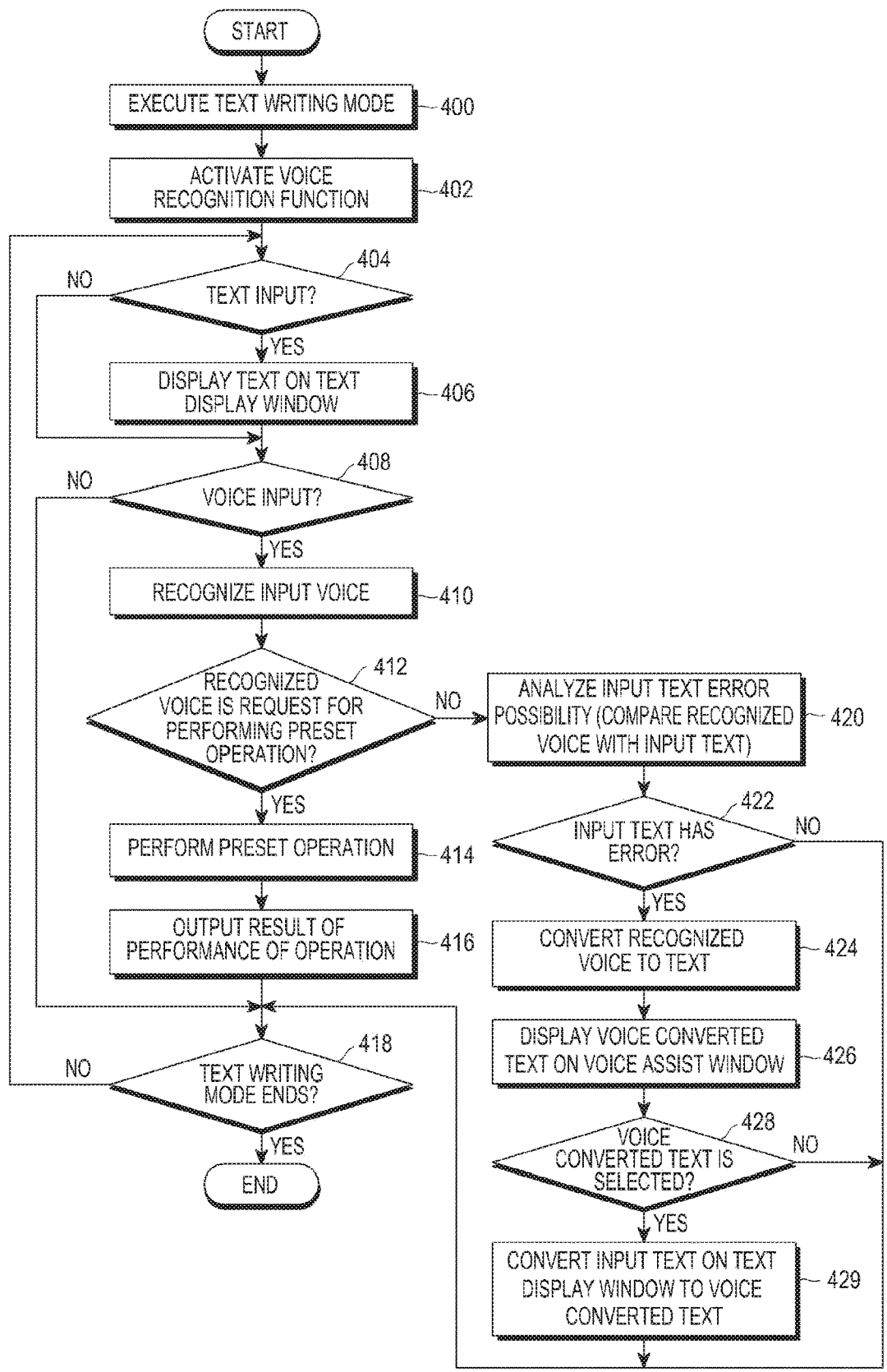
FIG. 7 is a flowchart illustrating a process of assisting a preset operation and a text modification by using the voice recognition according to the second embodiment of the present invention.

FIG. 7 is a flowchart illustrating a process of assisting a preset operation and a text modification by using voice recognition according to the second embodiment of the present invention. An operation of simultaneously inputting a voice and a text in the text writing mode, performing a preset operation by using the input voice and assisting a modification of the input text by using the input voice will be described.

Referring to FIG. 7, steps 400 to 406 are steps for performing a preset operation according to a key input or a touch input in the preset operation mode of the first process of FIG. 2, which describe an operation of executing the text writing mode and displaying the input text on a preset text display window.

First, the text writing mode is executed through a user control input in step 400, and a voice recognition function of the voice recognition module 111 is activated in step 402. At this time, the voice recognition function of the voice recognition module 111 may be automatically activated simultaneously with the execution of the text writing mode or may be activated by a user's selection. Thereafter, it is determined whether the text is input through the physical or virtual keypad 166 according to a key input or a touch input in step 404. When the text is input, the input text is displayed on a preset text display window (i) in step 406. If not, voice input is determined in step 408.

The remaining steps are processes corresponding to the second process of FIG. 2 of recognizing the voice input during the execution of the preset operation of the preset operation mode as described in FIG. 2 to assist performance of the operation of the first process according to the recognized voice.

It is determined whether a voice is input through the microphone 162 in step 408. The voice input at this time can be made in all cases such as where the text is not input, the text is being input, or the text is input and then displayed in the text writing mode. Hereinafter, all these cases, where the text is not input, the text is being input, or the text is input and then displayed in the text writing mode, will be described with reference to the case where the text is being input. When a voice is input from the user while the text is being input in the text writing mode, the activated voice recognition module 111 recognizes the input voice in step 410. If there is no voice input, the user determines whether to end the text writing mode at step 418.

Steps 412 to 416 describe performance of the preset operation command. When the recognized voice is the preset operation command, the preset operation command is performed by applying the recognized voice.

It is determined whether the recognized voice is the preset operation command in step 412. When the recognized voice is the preset operation command, the preset operation command is performed by applying the recognized voice in step 414. When performance of the preset operation command is completed, a result of the performance of the operation is output in step 416. At this time, the performance of the operation command should not interrupt the inputting of the text and the displaying of the input text. That is, the text input can be performed simultaneously with the voice input and recognition of the input voice. Further, when the text is input while the preset operation command of the input and recognized voice is performed, the text can be displayed.

The user selects whether to end the text writing mode in step 418. When the user does not desire to end the text writing mode, the process returns to step 404. When the user selects to end the text writing mode, the text writing mode ends.

Steps 420 to 429 describe the operation of assisting the modification of the text. That is, in step 412, if it is determined that the recognized voice is not the preset operation command, the possibility of an error in the input text is analyzed by comparing the displayed text with the recognized voice in step 420. When the displayed text is not identical to the recognized voice, it is determined that the displayed text has an error, and thus the recognized voice is converted to the text and a modification of the displayed text is assisted.

Thereafter, it is determined whether the input text has an error in step 422. That is, when the displayed text is not identical to the recognized voice through the comparison between the displayed text and the recognized voice, it is determined that the displayed text has an error. When the displayed text has an error, the recognized voice is converted to text in step 424, and the voice converted text is displayed on the preset voice assist window (j) in step 426. Thereafter, the user identifies the contents of the text display window (i) and contents of the voice assist window (j) and determines whether to change the contents of the text display window (i) to the contents of the voice assist window (j) in step 428. When the user desires to change the contents of the text display window (i) to the contents of the voice assist window (j), the user converts the text displayed on the text display window (i) into the voice converted text displayed on the voice assist window (j) by applying a preset function to change the contents of the text display window (i) into the contents of the voice assist window (j) through a user's control input in step 429, which may be done by any of buttons 161, keypad 166, or a voice command input through microphone 162. The preset function for changing the contents of the text display window (i) into the contents of the voice assist window (j) may be set as an item in the text writing mode, a popup window on the touch screen 190, or an input of a preset voice command. In addition, when a recognized voice has no similarity with the displayed text, the preset operation command is not applied when the voice recognition is applied.

After step 429, the user selects whether to end the text writing mode in step 418. When the user does not desire to end the text writing mode, the process returns to step 404. When the user selects to end the text writing mode, the text writing mode ends.

In addition, in step 422, if there is an error in the text, the user selects whether to end the text writing mode in step 418. Also, in step 428, if the user decides not to change the contents of text display window (i) to the contents of voice assist window (j), the user selects whether to end the text writing mode in step 418.

Figure 8:
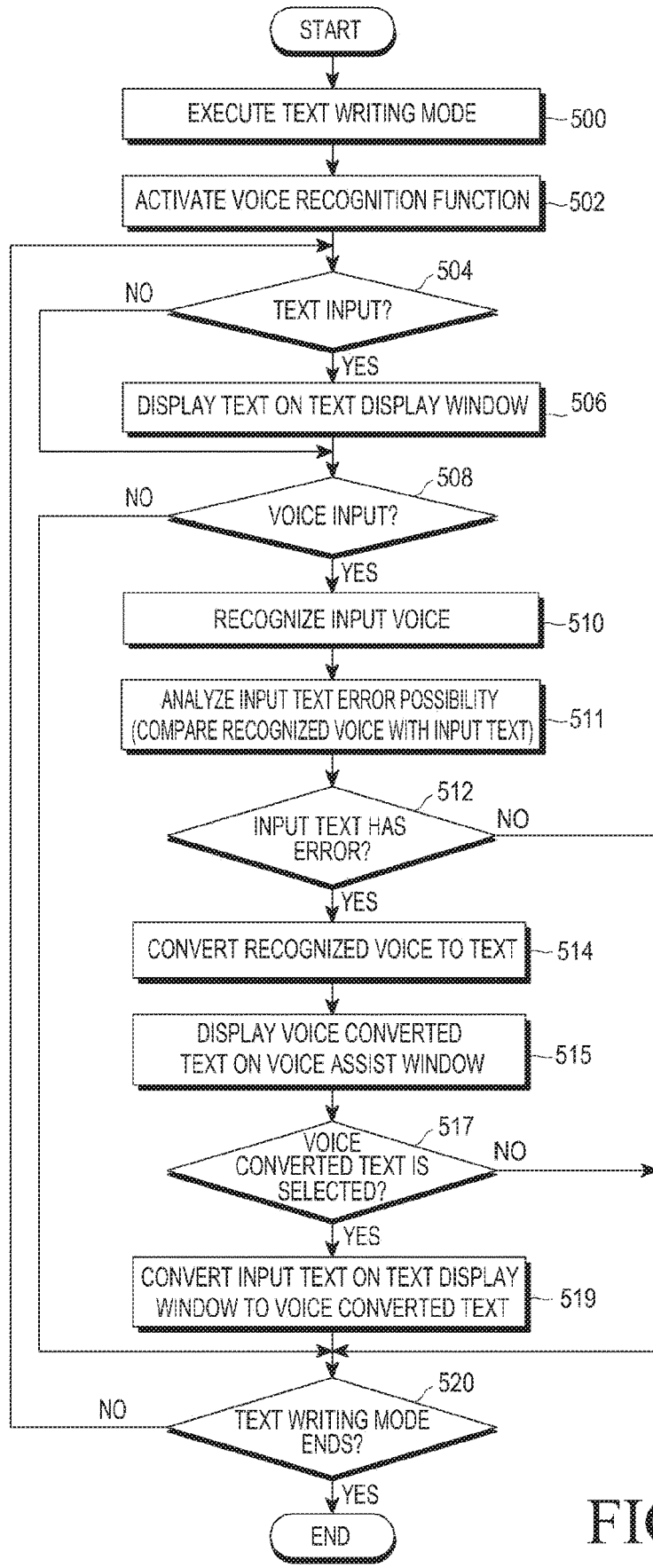
FIG. 8 is a flowchart illustrating a process of assisting a text modification by using the voice recognition according to the third embodiment of the present invention.

FIG. 8 is a flowchart illustrating a process of assisting a text modification by using voice recognition according to a third embodiment of the present invention. An operation of simultaneously inputting a text and a voice in the text writing mode and assisting an error modification of the input text by using the input voice will be described.

The operation of FIG. 8 is identical to the operation of assisting the modification of the input text by using the input voice in the text writing mode of FIG. 3. Accordingly, the operation of assisting the modification of the text by using voice recognition will briefly described.

First, the text writing mode is executed through a user control input in step 500, and a voice recognition function of the voice recognition module 111 is activated in step 502. Thereafter, it is determined whether the text is input through the physical or virtual keypad 166 according to a key input or a touch input in step 504. When the text is input, the input text is displayed on a preset text display window (i) in step 506. If not, voice input is determined in step 508.

Thereafter, it is determined whether a voice is input through the microphone 162 in step 508. When a voice is input while the text is being input in the text writing mode, the activated voice recognition module 111 recognizes the input voice in step 510. If there is no voice input, the user determines whether to end the text writing mode in step 520.

Next, the possibility of the error of the input text is analyzed by comparing the displayed text with the recognized voice in step 511, and it is determined whether the input text has an error in step 512. That is, when the displayed text is not identical to the recognized voice through the comparison between the display text and the recognized voice, it is determined that the displayed text has an error. When the displayed text is identical to the recognized voice, it is determined that the displayed text has no error, and the user determines whether to end the text writing mode in step 520.

As a result of the determination whether the input text has an error in step 512, when the displayed text has an error, the recognized voice is converted to text in step 514, and the voice converted text is displayed on a preset voice assist window (j) in step 515. The user identifies contents of the text display window (i) and contents of the voice assist window (j) and determines whether to change the contents of the text display window (i) to the contents of the voice assist window (j) in step 517. When the user desires to change the contents of the text display window (i) to the contents of the voice assist window (j), the user converts the text displayed on the text display window (i) into the voice converted text displayed on the voice assist window (j) by applying a preset function to change the contents of the text display window (i) to the contents of the voice assist window (j) through a user's control input in step 519, as described above.

Thereafter, the user selects whether to end the text writing mode in step 520. When the user does not desire to end the text writing mode, the text writing mode does not end and the process returns to step 504. When the user selects to end the text writing mode, the text writing mode ends.

The method of assisting performance of the operation by using the voice recognition according to the present invention in an execution of a list menu which is one of the user operation modes will be described.

Figure 9:
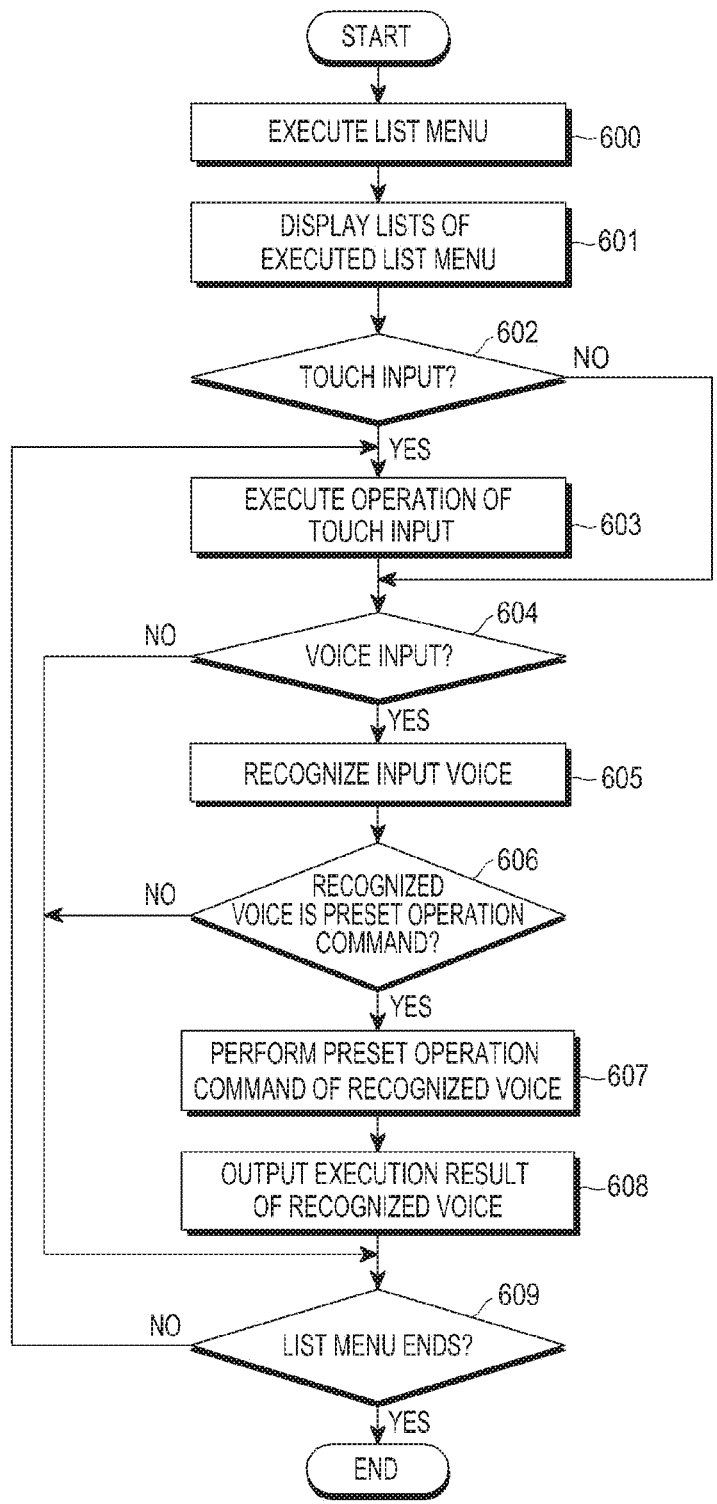
FIG. 9 is a flowchart illustrating a process of assisting an input operation in a list menu by using voice recognition according to a fourth embodiment of the present invention.

FIG. 9 is a flowchart illustrating a process of assisting an input operation in a list menu by using voice recognition according to a fourth embodiment of the present invention. An operation of simultaneously inputting a preset operation command and a voice in a screen displaying the list and assisting an execution of the preset operation command by using the input voice will be described.

Referring to FIG. 9, steps 600 to 603 are steps for performing the preset operation of the operation mode according to a key input or a touch input in the preset operation mode in the first process of FIG. 2.

First, the list menu is executed through a user control input in step 600, and lists of the executed list menu are displayed in step 601. At this time, the voice recognition function of the voice recognition module 111 may be automatically activated or may be activated by a user's selection, using buttons 161, keypad 166 or microphone 162. Thereafter, it is determined whether there is a touch input on the touch screen 190 in step 602. If not, the user determines whether to end the list menu mode in step 609. When there is the touch input on the touch screen 190, an operation of the touch input is executed in step 603. The touch input at this time is a scrolling touch input, which corresponds to an input of a flick operation in which the user contacts a particular area of displayed lists by using a body part or a touchable input device and then removes the body part or the touchable input device from the particular area in a movement direction. At this time, the displayed lists may be scrolled in an up, down, left, or right direction according to a scrolling direction.

The remaining steps correspond to the second process of FIG. 2 of recognizing the voice input during the execution of the preset operation of the operation mode of the first process of FIG. 2 in which an operation of assisting a touch operation input in a list menu is described.

In step 604, it is determined whether a voice is input through the microphone 162. If not, the user determines whether to end the list menu mode in step 609. The input voice at this time can be made in all cases, such as where the touch is not input, the touch is being input, and a preset operation command is being performed during the touch input when the lists of the list menu are displayed. Hereinafter, all these cases where the touch is not input, the touch is being input, or the preset operation command is being performed during the touch input when the lists of the list menu are displayed, will be described with reference to the case where the touch operation is being performed. When a voice is input by the user while a scrolling operation of the touch operation is performed in the state where the lists are displayed, the activated voice recognition module 111 recognizes the input voice in step 605.

It is determined whether the recognized voice is the preset operation command in step 606. If not, the user determines whether to end the list menu mode in step 609. A recognized voice which has no similarity with the preset operation command is not applied. When the recognized voice is the preset operation command, the preset operation command of the recognized voice is performed during performance of the touch operation in step 607, and a result of the execution of the operation command is output in step 608. The preset operation command may be a command set to automatically perform the scrolling operation from the display list to a desired position in the preset up, down, left, or right direction. Further, the command set to automatically perform the scrolling operation from the list to the desired position may include a command set to automatically perform a scrolling operation to a position of one or more words, a character string, or a phrase, a position of a part of the all lists, and a position of a language for each country.

Thereafter, it is determined whether to end the list menu through a user's selection in step 609. When the user desires to continuously perform the operation, the list menu does not end and the process returns to step 602. When the list menu ends through the user's selection, a screen displaying the list menu ends.

Figure 10:
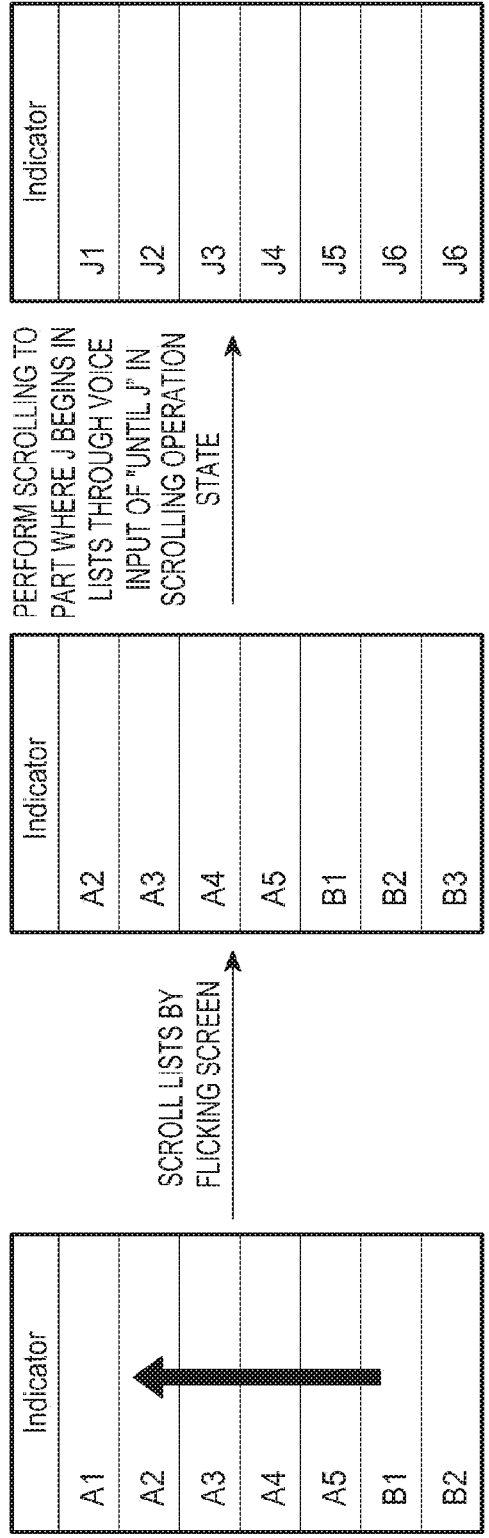
FIGS. 10A to 10C illustrate an example of assisting the input operation in the list menu by using the voice recognition according to the fourth embodiment of the present invention.
Figure 11:
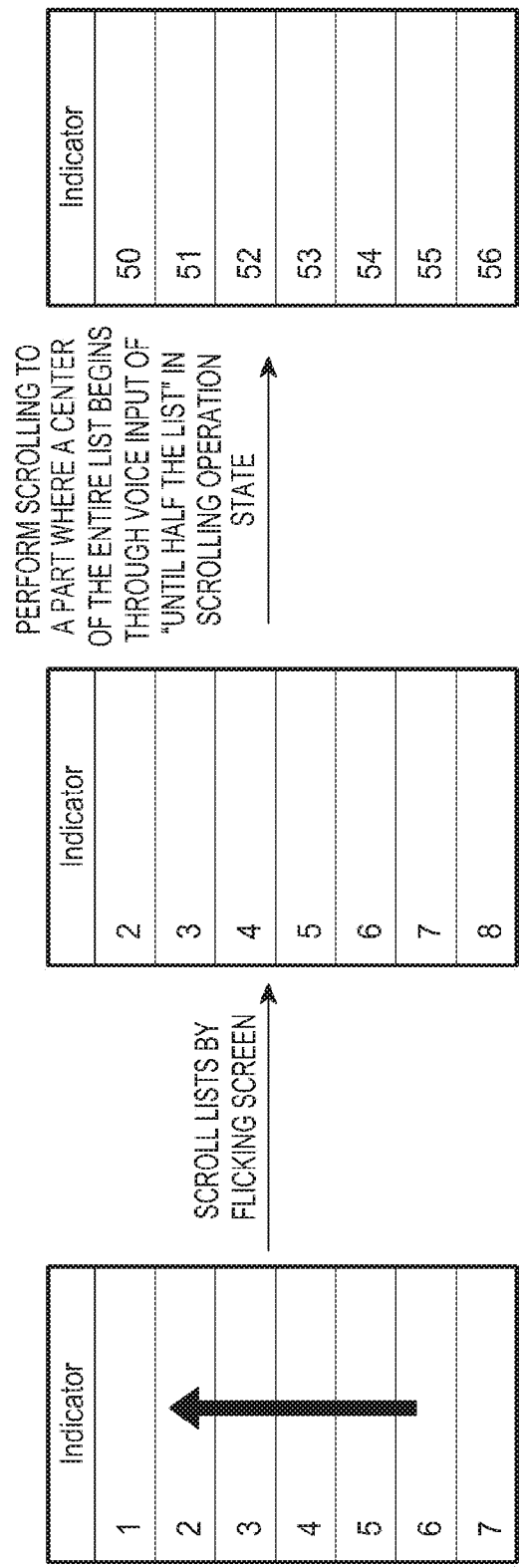
FIGS. 11A to 11C illustrate an example of assisting an input operation in a list menu by using voice recognition according to a fifth embodiment of the present invention.
Figure 12:
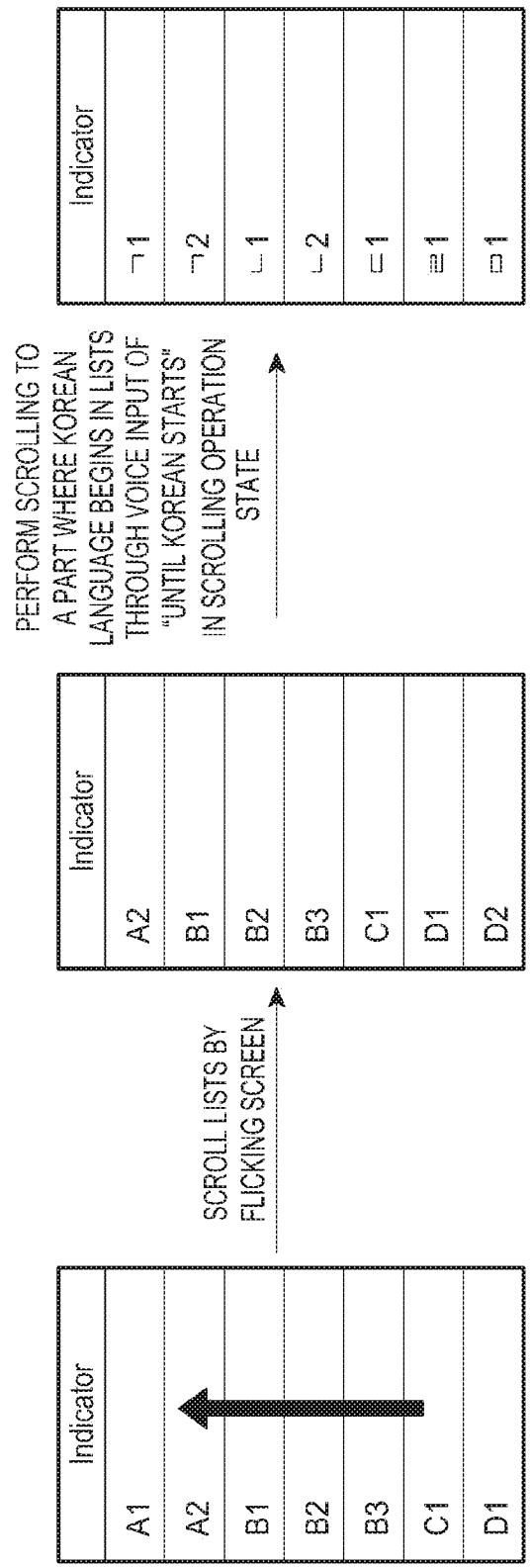
FIGS. 12A to 12C illustrate an example of assisting an input operation in a list menu by using voice recognition according to a sixth embodiment of the present invention.

FIGS. 10 to 12 are examples of assisting an input operation in the list menu by using voice recognition according to fourth, fifth, and sixth embodiments of the present invention, respectively. Performance of the input operation in the list menu by using voice recognition will be described in detail with reference to FIGS. 10 to 12.

First, the list menu is executed through the users' selection, and lists of the executed list menu are displayed. FIG. 10A, FIG. 11A, and FIG. 12A are images of screens where the list menu is executed and then lists are displayed.

When the lists are displayed, a scrolling operation is performed in a direction shown by the arrow in FIG. 10A, FIG. 11A, and FIG. 12A through a flick input of the user. FIG. 10B, FIG. 11B, and FIG. 12B are images of screens displaying particular images when the displayed lists are scrolled.

A preset command is performed by putting a voice of the preset command during the scrolling operation. FIG. 10C illustrates an image of a screen where a scrolling operation is performed on the list to a part where items in the list beginning with the letter J begins when a voice of the preset command of "Until J" is input. Further, FIG. 11C illustrates an image of a screen where a scrolling operation is performed to a part where a center of the entire list begins when a voice of the preset command of "Until half the list" is input. In addition, FIG. 12C is an image of a screen where a scrolling operation is performed to a part of the entire list where items in the list exist in the Korean language begins when a voice of the preset command of "Until Korean starts" is input.

The method of assisting performance of the operation by using voice recognition according to the present invention when a home screen which is one of the user operation modes is edited will be described.

Figure 13:
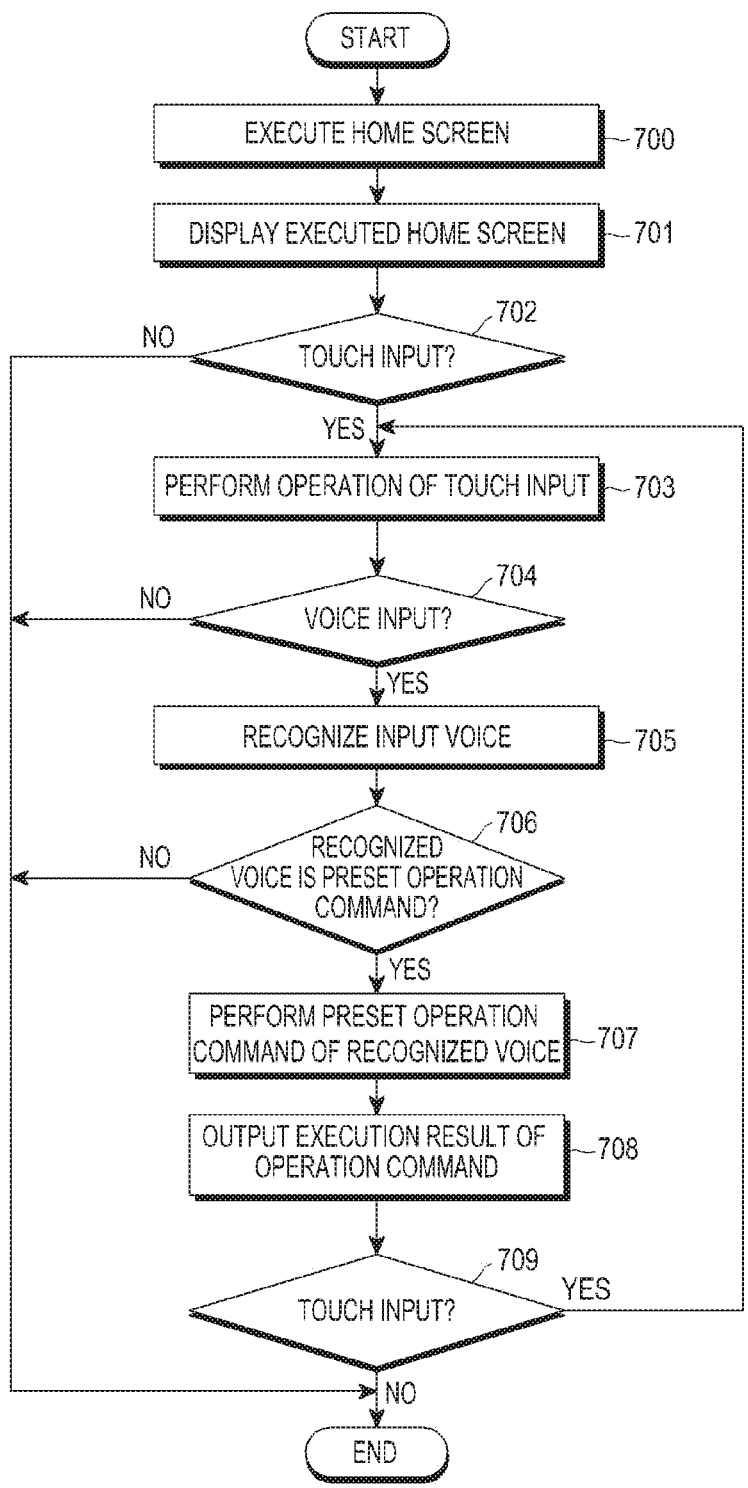
FIG. 13 is a flowchart illustrating a process of assisting a home screen editing by using the voice recognition according to the fifth embodiment of the present invention.

FIG. 13 is a flowchart of assisting a home screen editing by using voice recognition according to a fifth embodiment of the present invention. An operation of simultaneously inputting a preset operation command and a voice in an executed home screen and assisting an execution of the preset operation command by using the input voice is described.

Referring to FIG. 13, steps 700 to 703 are steps for performing the preset operation of the operation mode according to a key input or a touch input in the preset operation mode in the first process of FIG. 2.

First, a home screen is executed through a user control input in step 700, and a page of the executed home screen is displayed in step 701. The home screen is preset to include preset home screen pages including preset items, wherein one or more home screen pages may be preset. Further, the voice recognition function of the voice recognition module 111 may be automatically activated or may be activated by a user's selection using buttons 161, keypad 166 or microphone 162. Thereafter, it is determined whether there is a touch input on the touch screen 190 in step 702. When there is the touch input on the touch screen 190, an operation of the touch input is performed in step 703. If not, the process ends.

The touch input at this time is a dragging touch input, which corresponds to an input of a flick operation in which the user contacts one or more particular items in a displayed page of the home screen by using a body part or a touchable input device and then removes the body part or the touchable input device from the contacted particular items in a movement direction. At this time, the items can be moved from one page of the home screen to another page of the home screen through the dragging in an up, down, left, or right direction according to a dragging direction.

The remaining steps correspond to the second process of FIG. 2 of recognizing the voice input during the execution of the preset operation of the operation mode of the first process of FIG. 2.

It is determined whether a voice is input through the microphone 162 in step 704. The voice input through the microphone 162 can be made in all cases where a touch is not input, a touch is being input, and a preset operation command is being performed during the touch input when the home screen is displayed. Hereinafter, in all these cases where the touch is not input, the touch is being input, or the preset operation command is being performed during the touch input when the home screen is displayed, will be described with reference to the case where the touch operation is being performed. When a voice is input by the user while the touch operation is performed when the home screen is displayed, the activated voice recognition module 111 recognizes the input voice in step 705. If there is no voice input, the process ends.

Thereafter, it is determined whether the recognized voice is the preset operation command in step 706. At this time, a recognized voice which has no similarity with the preset operation command is not applied. If the recognized voice is not the preset operation command, the process ends.

A determination of whether the recognized voice is the preset operation command in step 706 will be described in detail. First, when dragging is performed to another page of the preset home screen by applying a touch to a preset item, it is determined whether there is a space where the dragged item can be located in the page of the home screen. When the item is moved through a touch input and there is a space to place the item when the touch ends, "dragging the item" means "placing the item". When there is no space to place the item, "dragging the item" means "returning the item to an original place". When there is no space to place the dragged item in the page of the home screen, it is determined whether the recognized voice in a dragged state is the preset operation command. When the recognized voice is the preset operation command, the preset operation command of the recognized voice is performed during performance of the touch operation in step 707, and a result of performance of the operation command is output in step 708. The preset operation command may be a preset operation command which moves a preset item of a page of the preset home screen to another page. Further, the preset operation command may be a preset command which generates a new page of the home screen. As a result of the performance of the preset operation command of the recognized voice, when there is the space to place the item, an applied touch ends through an operation of removing a user's body part or a touchable input device from the item, and the item is placed in a page of the home screen where the touch ends.

Thereafter, based on whether the touch input of the user is performed, the operations from step 702 may be performed again when the user desires to continuously perform the operations, and the home screen editing ends when the user does not perform the touch input in step 709.

FIGS. 14A to 14E illustrate an example of assisting the home screen editing by using voice recognition according to the seventh embodiment of the present invention.

First, when the home screen is executed by a control input of the user, the executed home screen is displayed. FIG. 14A illustrates an image of a screen where the home screen is executed and then displayed, and FIG. 14B illustrates an image of an editing mode screen of the home screen when a touch is input and a touch state is maintained. It is assumed that the home screen of FIG. 14A and FIG. 14B is page 1.

When the home screen is displayed, an item on the home screen is dragged to another page of the home screen through the touch input by the user. FIG. 14C illustrates an image where the item on the home screen is dragged to another page of the home screen through the touch input by the user. It is assumed that the home screen of FIG. 14C is page 3 and there is no space to place a new item in the screen of page 3. As illustrated in FIG. 14C, when there is no space to place the new item in the page of the home screen to which the item is dragged, a message informing the user that there is no space is displayed on the screen or the user is informed of the fact that there is no space through a voice, through which the user can identify that there is no space. The user inputs the preset operation command through the voice in a dragging operation state, and the terminal performs the preset operation command by recognizing the input voice. For example, the user can move all items in page 3 to another page of the home screen through a voice command of "Move all other items to the next page". FIG. 14D illustrates an image in a touch and dragging state where the preset operation command is performed, and all items in page 3 are moved to another page of the home screen. FIG. 14E illustrates an image in a touch and dragging state where the touch ends, an icon is placed in a position where the touch ends, and an editing mode ends.

In addition, the preset operation command in the home screen may be set to perform functions such as deletion and copy of the item or set to move only some items selected by the user when the user desires to move items.

It may be appreciated that the embodiments of the present invention can be implemented in software, hardware, or a combination thereof. Any such software may be stored as described above, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method using voice recognition, the method comprising:
   displaying an input text according to a key input or a touch input in a text writing mode on a text display window;

recognizing a voice input while displaying the input text according to the key input or the touch input on the text display window; and assisting a preset text writing operation according to the recognized voice input while displaying the input text according to the key input or the touch input on the text display window, wherein assisting the preset text writing operation comprises:

identifying whether a first part of the recognized voice input matches a pre-stored command, and in response to the first part of the recognized voice input matching the pre-stored command, displaying a result obtained based on a second part of the recognized voice input, together with the input text according to the key input or the touch input, on the text display window.

2. The method of claim 1, wherein assisting the preset text writing operation further comprises:

comparing the displayed text with the recognized voice input, when there is no part of the recognized voice input matching the pre-stored command;

determining that the displayed text has an error when the displayed text is not identical to the recognized voice input;

determining that the displayed text has no error when the displayed text is identical to the recognized voice input; and when it is determined that the displayed text has the error, converting the recognized voice input to text and modifying the displayed text.

3. The method of claim 2, wherein modifying the displayed text comprises:

converting the recognized voice input to the text and displaying the voice converted text on a voice assist window; and changing the displayed text on the text display window to the displayed voice converted text when a preset function of changing contents of the text display window to contents of the voice assist window is applied.

4. The method of claim 1, wherein the result obtained based on the second part of the recognized voice input is displayed when a performance of the pre-stored command is completed, and wherein displaying the input text according to the key input or the touch input on the text display window is not interrupted while performing the pre-stored command.

5. An apparatus for assisting a text writing operation by using voice recognition, the apparatus comprising:

an input/output module including at least one button and a physical or virtual keypad configured to receive a control input of a user, and a microphone receiving a voice input from the user;

a touch screen configured to receive a control input of the user and display an execution image, an operation state, and a menu state of an application program; and a controller including a voice recognition module, the controller configured to:

control the input/output module and the touch screen, display a text received from the input/output module on a text display window of the touch screen, recognize a voice input by the user through the microphone of the input/output module while displaying the text received from the input/output module on the text display window, and assist a preset text writing operation according to the recognized voice input while displaying the text received from the input/output module on the text display window, by identifying whether a first part of the recognized voice input matches a pre-stored command, and displaying, in response to the first part of the recognized voice input matching the pre-stored command, a result obtained based on a second part of the recognized voice input, together with the text received from the input/output module, on the text display window.

6. The apparatus of claim 5, wherein the controller is further configured to:

compare the displayed text with the recognized voice input when there is no part of the recognized voice input matching the pre-stored command, determine that the displayed text has an error when the displayed text is not identical to the recognized voice input, determine that the displayed text has no error when the displayed text is identical to the recognized voice input, and when it is determined that the displayed text has the error, convert the recognized voice input to text and modifying the displayed text.

7. The apparatus of claim 6, wherein the controller is further configured to:

display the voice converted text on a voice assist window of the touch screen, and change the displayed text on the text display window to the displayed voice converted text, if the user selects a function to change the contents of the text display window into the contents of the voice assist window.

8. The apparatus of claim 5, wherein the controller is further configured to display the result obtained based on the second part of the recognized voice input when a performance of the pre-stored command is completed, and wherein displaying the input text according to the key input or the touch input on the text display window is not interrupted while performing the pre-stored command.

* * * * *